United States Patent
Kanno et al.

(10) Patent No.: US 11,077,821 B2
(45) Date of Patent: Aug. 3, 2021

(54) VEHICLE BODY FRONT STRUCTURE

(71) Applicant: HONDA MOTOR CO., LTD., Tokyo (JP)

(72) Inventors: Osamu Kanno, Wako (JP); Takashi Aoki, Wako (JP); Masato Sasaki, Wako (JP); Kenyu Okamura, Wako (JP); Hidetoshi Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 98 days.

(21) Appl. No.: 16/431,929

(22) Filed: Jun. 5, 2019

(65) Prior Publication Data

US 2019/0375368 A1 Dec. 12, 2019

(30) Foreign Application Priority Data

Jun. 8, 2018 (JP) ............................. JP2018-109996

(51) Int. Cl.
| | |
|---|---|
| *B60R 21/38* | (2011.01) |
| *B60R 21/36* | (2011.01) |
| *B62D 25/12* | (2006.01) |
| *B60R 21/34* | (2011.01) |

(52) U.S. Cl.
CPC .............. *B60R 21/38* (2013.01); *B60R 21/36* (2013.01); *B62D 25/12* (2013.01); *B60R 2021/343* (2013.01); *B60R 2300/8033* (2013.01)

(58) Field of Classification Search
CPC ................................ B60R 21/36; B60R 21/38
See application file for complete search history.

(56) References Cited

U.S. PATENT DOCUMENTS

| | | | | |
|---|---|---|---|---|
| 7,357,212 B2 * | 4/2008 | Sasaki | ..................... | B60R 21/36 180/274 |
| 7,571,955 B2 * | 8/2009 | Nagae | ................. | B60R 21/0136 296/187.09 |
| 7,836,996 B2 * | 11/2010 | Kitte | ....................... | B60R 21/36 180/271 |

(Continued)

FOREIGN PATENT DOCUMENTS

| | | | | |
|---|---|---|---|---|
| DE | 10021143 A1 * | 10/2001 | ............. | B60R 21/38 |
| DE | 10330588 A1 * | 2/2005 | ............. | B60R 21/38 |

(Continued)

OTHER PUBLICATIONS

Negre, Motor Vehicle I.e. Light Weight Compressed Air Car, For Urban Use, Has Safety Device Comprising Air Bag Deployed Outside . . . , Apr. 2, 2010, EPO, FR 2936461 A1, Machine Translation of Description (Year: 2010).*

(Continued)

*Primary Examiner* — Paul N Dickson
*Assistant Examiner* — Matthew D Lee
(74) *Attorney, Agent, or Firm* — Rankin, Hill & Clark LLP

(57) ABSTRACT

A vehicle body front structure includes a pop-up hood unit disposed on a front end portion of an enginehood of a vehicle body and configured to move upward above the enginehood by using a lift-up mechanism. The pop-up hood unit is deformable due to an input of an impact upon a collision with a target for protection. The pop-up hood unit is shaped as a plate that extends in a left-right direction of the vehicle body and has a plate surface having an inclination angle that is variable relative to a horizontal plane.

6 Claims, 10 Drawing Sheets

(56) References Cited

U.S. PATENT DOCUMENTS

| | | | | |
|---|---|---|---|---|
| 7,997,375 B2* | 8/2011 | Shaw | ................. | B60R 21/38 |
| | | | | 180/274 |
| 10,195,999 B1* | 2/2019 | Glickman | ............ | B62D 25/105 |
| 2004/0074688 A1* | 4/2004 | Hashimoto | ............. | B60R 21/36 |
| | | | | 180/271 |
| 2015/0211265 A1* | 7/2015 | Uyanik | ................ | B60R 21/38 |
| | | | | 292/195 |
| 2020/0047709 A1* | 2/2020 | Gunji | ................. | B60R 21/38 |
| 2020/0062202 A1* | 2/2020 | Umezawa | ............... | B60R 21/36 |
| 2020/0290682 A1* | 9/2020 | Sasaki | ................. | B62D 25/12 |

FOREIGN PATENT DOCUMENTS

| | | | | |
|---|---|---|---|---|
| DE | 102005012719 A1 * | 9/2006 | ............. | B60R 21/36 |
| EP | 2905184 A1 * | 8/2015 | ......... | B60R 21/0136 |
| FR | 2936461 A1 * | 4/2010 | ............ | B60R 21/36 |
| GB | 2400353 A * | 10/2004 | ............ | B60R 21/34 |
| JP | 2000-168473 A | 6/2000 | | |
| KR | 100645206 B1 * | 11/2006 | | |

OTHER PUBLICATIONS

Ries, Safety Device For Vehicle Has Energy Storage Unit With Energy Storage Devices Activated Independently and/or at Time Intervals Depending on Collision ConditionsTo Raise Hood, Oct. 31, 2001, EPO, DE 10021143 A1, Machine Translation of Description (Year: 2001).*

* cited by examiner

VEHICLE BODY FRONT STRUCTURE

CROSS-REFERENCE TO RELATED APPLICATIONS

This application is based upon and claims the benefit of priority from Japanese Patent Application No. 2018-109996 filed on Jun. 8, 2018; the entire contents of which are incorporated herein by reference.

BACKGROUND OF THE INVENTION

The invention relates to a vehicle body front structure which protects a target for protection such as a pedestrian.

Conventionally there is known a kind of a vehicle body front structure which is disclosed in the patent document (Japanese Patent Application Laid-open No. 2000-168473).

The patent document discloses an airbag system to protect a target for protection such as a pedestrian. The airbag system includes an airbag which inflates to deploy in a range from the bumper upper surface of a vehicle body to approximately the front end portion of an enginehood when detecting or predicting a collision with the target for protection. The airbag absorbs and relieves an impact caused by a collision with the target for protection.

SUMMARY OF INVENTION

In the airbag in the vehicle body front structure of the patent document, however, a smaller volume of the airbag makes a deployment time shortened. Therefore, there is a problem that the airbag tends to deflate with an impact in case of a collision with the target for protection and the airbag cannot appropriately absorb the impact on the target for protection in case of the collision. If the airbag cannot appropriately absorb the impact on the target for protection in case of the collision, there is a high possibility that the target for protection is bounced rearward of the vehicle body. This is not preferable.

The invention is directed to a vehicle body front structure which appropriately absorbs an impact on a target for protection in case of a collision with the target.

An aspect of the present invention provides a vehicle body front structure. The vehicle body front structure includes a pop-up hood unit disposed on a front end portion of an enginehood of a vehicle body and configured to move upward above the enginehood by using a lift-up mechanism. The pop-up hood unit is deformable due to an input of an impact upon a collision with a target for protection.

According to the present invention, a vehicle body front structure appropriately absorbs an impact in case of a collision with a target for protection such as a pedestrian.

BRIEF DESCRIPTION OF THE ACCOMPANYING DRAWINGS

Figure 9:
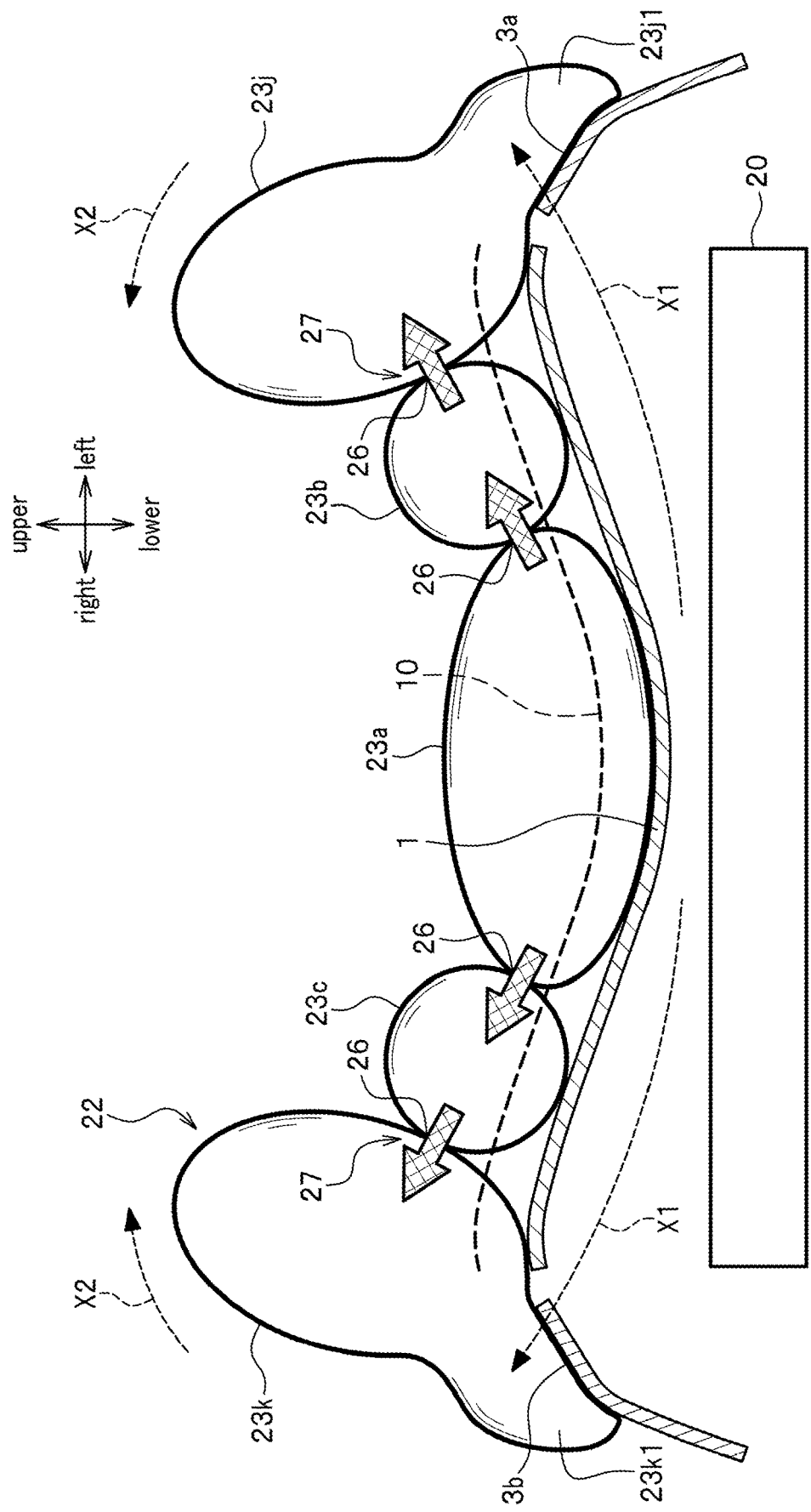
Figure 10:
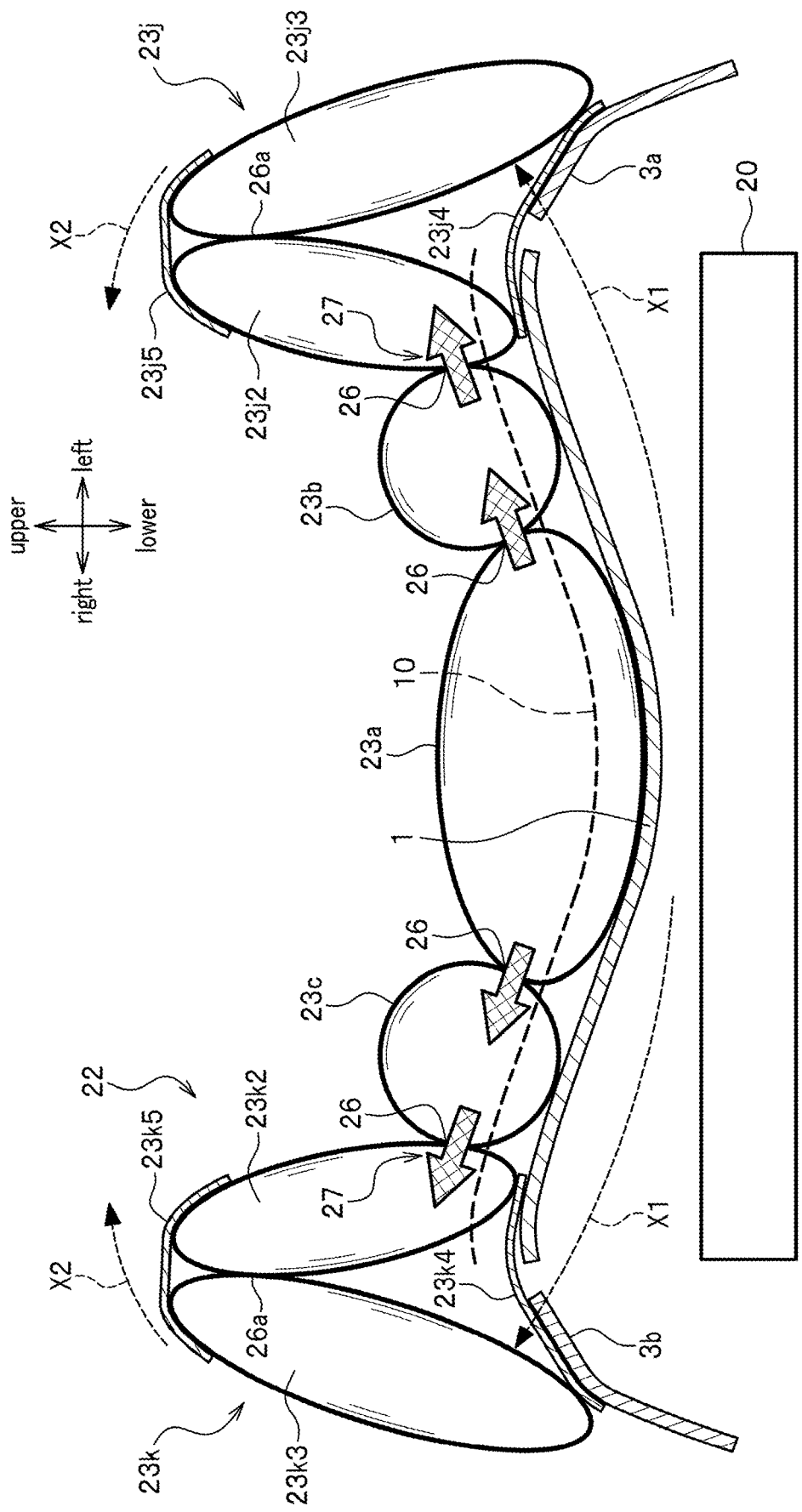

FIG. 9 is a partially sectional schematic front view illustrating a hop-up hood unit and a bag unit of an airbag system in case of a collision with a target for protection such as a pedestrian in a vehicle body front structure according to a fifth embodiment of the present invention; and FIG. 10 is a partially sectional schematic front view illustrating a hop-up hood unit and a bag unit of an airbag system in case of a collision with a target for protection such as a pedestrian in a vehicle body front structure according to a sixth embodiment of the present invention.

DESCRIPTION OF THE EMBODIMENTS

Embodiments of the present invention will be described in detail with reference to the accompanying drawings as appropriate. In the following description, the same constituents will be denoted by the same reference signs and overlapping explanations thereof will be omitted. When directions are discussed, such directions are based on front-rear, right-left, and upper-lower directions from viewpoints of a driver.

First Embodiment

Figure 1:
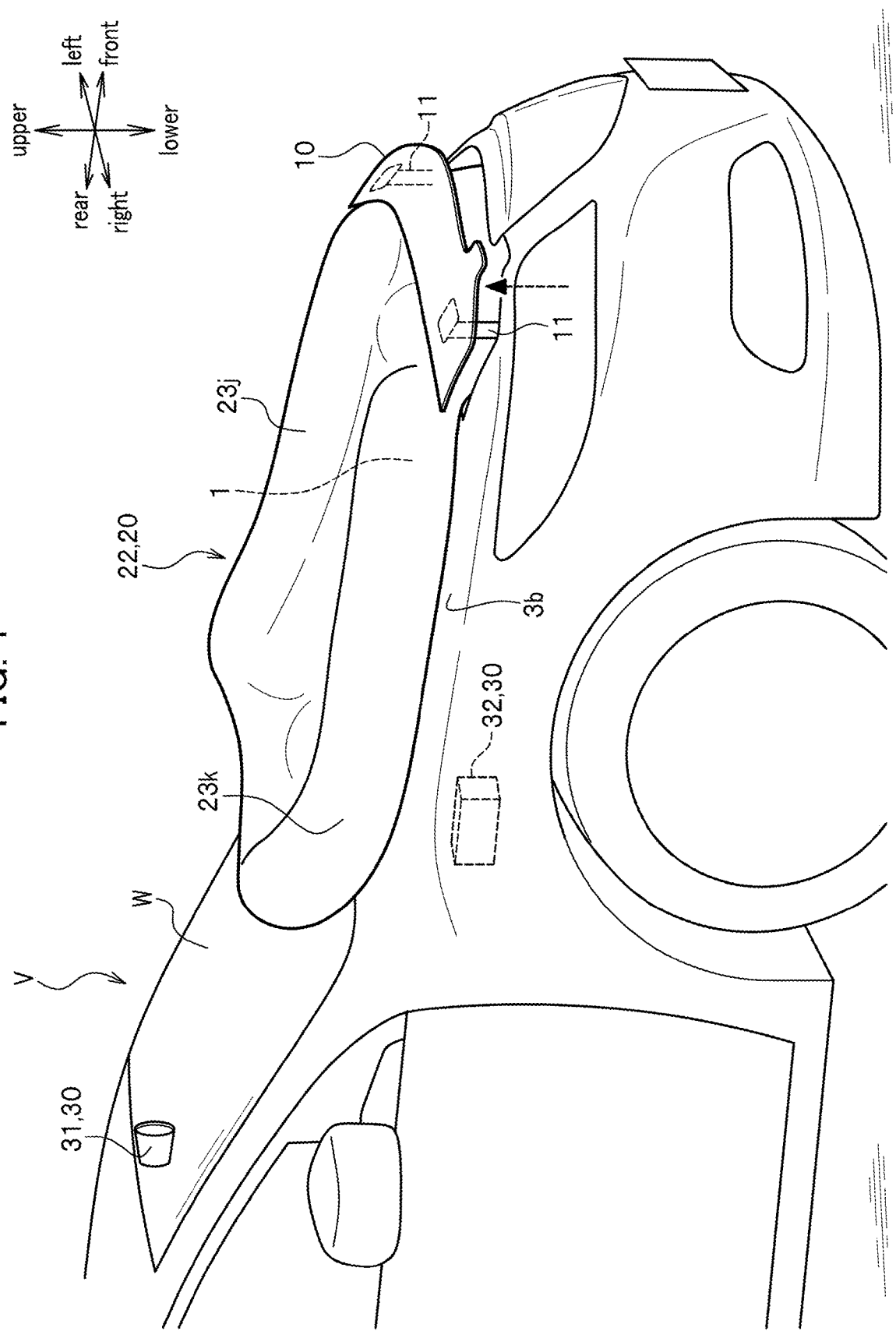
FIG. 1 is a perspective view of a vehicle body front portion, which illustrates a lifted hop-up hood unit and a deployed bag body of an airbag system, in a vehicle body front structure according to a first embodiment of the present invention.

As illustrated in FIG. 1, an automobile V provided with a vehicle body front structure according to this embodiment includes an enginehood 1 located at a front part of a vehicle body and covering the upper surface of an engine room, and a pop-up hood unit 10 located at the front end portion of the enginehood 1 with its front end portion configured to be lifted above the enginehood 1. In conjunction with an airbag system 20 to be described later, the pop-up hood unit 10 absorbs an impact caused by a collision with a target for protection such as a pedestrian (including a person on a bicycle or the like) (hereinafter simply referred to as the "pedestrian").

The pop-up hood unit 10 is made of a metal and obtained by pressing a steel plate, for example. The pop-up hood unit 10 takes on a plate shape that extends in a right-left direction of the vehicle body. The pop-up hood unit 10 is deformable due to an input of an impact in case of a collision with the pedestrian.

Here, a material of the pop-up hood unit 10 only needs to be capable of absorbing the impact on the pedestrian along with the deformation due to the input of the impact in case of the collision with the pedestrian. Such a material may be a plastically deformable material, an elastically deformable material, or a combination of these materials.

The pop-up hood unit 10 is lifted above the enginehood 1 by a predetermined amount through a lift-up mechanism that includes support rods 11 and a not-illustrated driving source configured to drive the support rods 11. A not-illustrated lock mechanism fixes the pop-up hood unit 10 at a position lifted by the predetermined amount. Any of a bouncing device adopting an electric motor or a spring force, and moreover, a device of so-called a pyrotechnic type that ejects a gas by a reaction of a gas-forming agent may be used as the driving source. When a collision detection device 30 to be described later detects a collision with the pedestrian or predicts a collision with the pedestrian, the driving source is activated upon receipt of an activation signal. Here, if a collision with the pedestrian is avoided, then the pop-up hood unit 10 may be retracted from the lifted position to an initial position.

Figure 2:
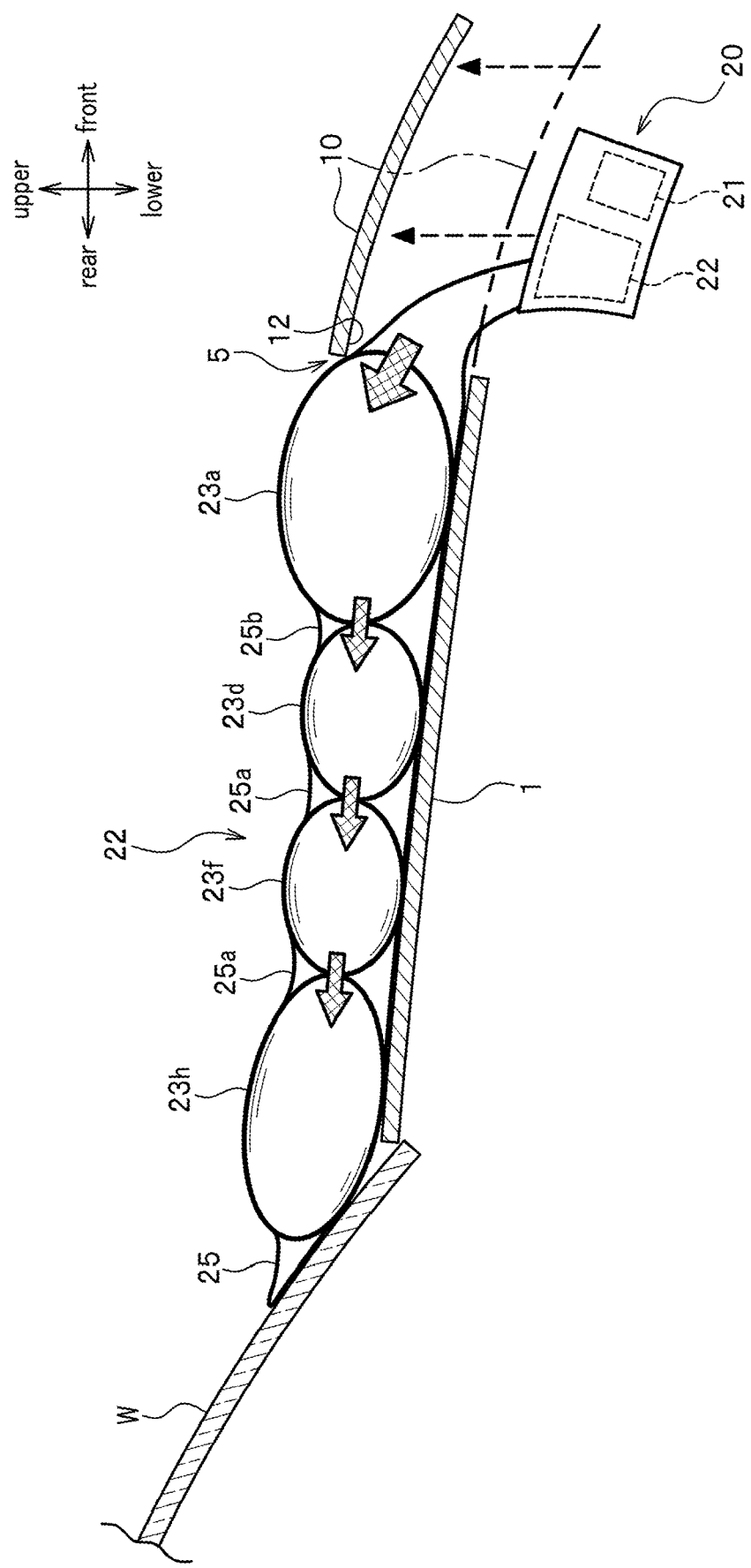
FIG. 2 is a schematic vertical section view illustrating a lifted hop-up hood unit and a deployed bag body.

As illustrated in FIG. 2, the airbag system 20 is arranged below the pop-up hood unit 10. The airbag system 20 includes an inflator unit 21 and a bag unit 22 to be deployed as an air bag. The bag unit 22 is folded back and stored in the airbag system 20.

Figure 3:
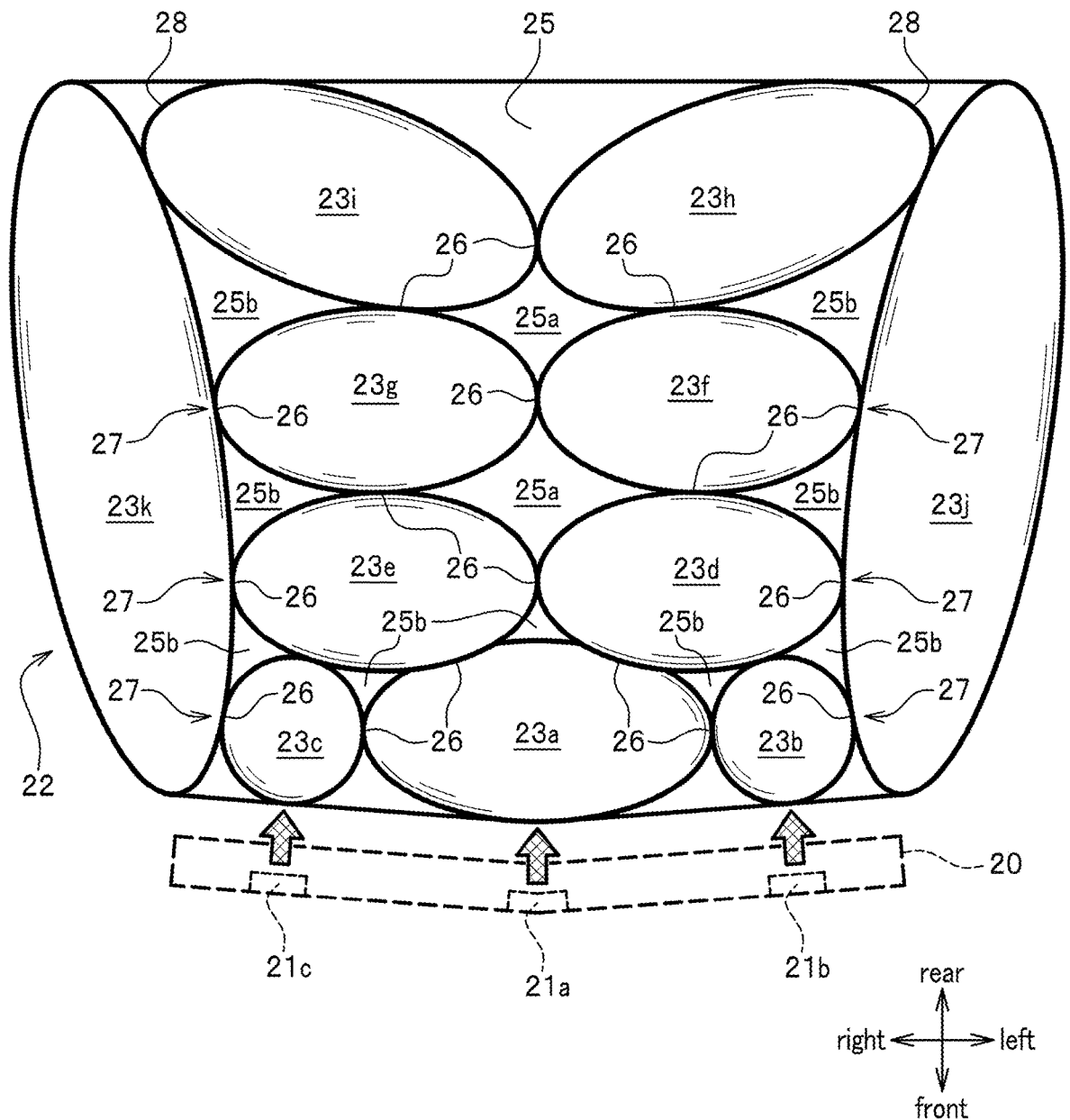
FIG. 3 is a schematic plane view illustrating a deployed bag unit.

The inflator unit 21 is a component to eject the gas into the bag unit 22. The inflator unit 21 is of a pyrotechnic type that applies the gas-forming agent. As illustrated in FIG. 3, the inflator 21 includes inflators 21a to 21c at space intervals in a left-right direction of the vehicle body. The inflator unit 21 includes a central inflator 21a located at a central part in the right-left direction of the vehicle body, a left inflator 21b located on a left side of the vehicle body, and a right inflator 21c located on a right side of the vehicle body. Each of the inflators 21a to 21c is ignited by an instruction from the collision detection device 30 to be described later, and ejects the gas accordingly.

Note that the airbag system 20 includes a not-illustrated controller for controlling the order of ejection and amounts of ejection of the gas from the inflators 21a to 21c. A control unit 32 (see FIG. 1) constituting a part of the collision detection device 30 is connected to the controller, whereby the controller controls ignition of the inflators 21a to 21c based on signals sent from the control unit 32. Details of the collision detection device 30 will be described later.

Here, the inflator unit 21 may employ, instead of the pyrotechnic type of an inflator, another type (a hybrid type) of an inflator configured to eject an inflation gas by breaking a bulkhead of a high-pressure gas cylinder filled with a high-pressure inflation gas with gunpowder or the like.

As illustrated in FIG. 1, the bag unit 22 is deployable in such a way as to cover the enginehood 1 almost entirely. As illustrated in FIG. 2, the bag unit 22 is deployed on the enginehood 1 through an opening 5 that is defined at the front end portion of the enginehood 1 with the lifted pop-up hood unit 10. In this case, the bag unit 22 is guided by a lower rear edge part 12 of the pop-up hood unit 10 and a portion in the vicinity thereof and is deployed continuously behind the pop-up hood unit 10. In other words, the pop-up hood unit 10 and the bag unit 22 collectively function as a single continuous impact absorption unit.

As illustrated in FIG. 3, the bag unit 22 includes multiple bags into which the bag unit is divided back and forth and right and left, and is formed into a symmetric structure. Specifically, the bag unit 22 includes bags 23a to 23i to be mainly deployed on the enginehood 1, and left and right upright bags 23j and 23k to be mainly deployed upright on left and right fenders 3a and 3b. The bags 23a to 23i as well as the left and right upright bags 23j and 23k are connected to one another by using a sheet member 25.

Each of the bags, 23a, 23d to 23i as well as the left and right upright bags 23j and 23k takes on a spheroidal shape in an inflated state. Meanwhile, each of the bags 23b and 23c adjacent to the bag 23a located at a central part of a front end takes on a spherical shape with a small diameter in an inflated state.

Each space surrounded by the bags adjacent to one another is formed into either a void 25a substantially in a rhombic shape or a void 25b substantially in a triangular shape. These voids 25a and 25b are intended to catch and hold the head, shoulders, waist, as well as elbows and other joints of a pedestrian H.

The bag 23a is located at the central part of the front end of the enginehood 1 and is arranged such that its longitudinal axis is oriented in the right-left direction in plan view. The gas flows from the central inflator 21a provided to the airbag system 20 into the bag 23a. The bag 23b is located on the left side of the bag 23a while the bag 23c is located on the right side of the bag 23a.

The gas flows from the left inflator 21b provided to the airbag system 20 into the bag 23b on the left side of the front end. Meanwhile, the gas flows from the right inflator 21c provided to the airbag system 20 into the bag 23c on the right side of the front end.

The bags 23d and 23e are located behind the left and right sides of the bag 23a at the central part of the front end. Moreover, the bags 23f and 23g are located behind the bags 23d and 23e, respectively. Each of the bags 23d and 23e as well as the bags 23f and 23g is arranged such that its longitudinal axis is oriented in the right-left direction in plan view. In addition, the bags 23h and 23i are located further behind the bags 23f and 23g, respectively. The bag 23h is arranged such that its longitudinal axis is oriented diagonally leftward and rearward in plan view. On the other hand, the bag 23i is arranged such that its longitudinal axis is oriented diagonally rightward and rearward in plan view. The bags 23h and 23i are provided with discharge valves 28, respectively, which are capable of discharging the gas.

The bags 23a to 23i as well as the left and right upright bags 23j and 23k are configured to communicate with one another through communication paths 26.

The bags 23b, 23d, and 23f that communicate with one another are connected to a right side part of the upright bag 23j on the left at intervals from a front side to a rear side thereof. The communication path 26 and a one-way valve 27 are provided at each connection of the upright bag 23j. The one-way valve 27 is a valve that allows the flow of the gas only in a direction from any of the bags 23b, 23d, and 23f to the upright bag 23j.

The bags 23c, 23e, and 23g that communicate with one another are connected to a left side part of the upright bag 23k on the right at intervals from a front side to a rear side thereof. The communication path 26 and the one-way valve 27 are provided at each connection of the upright bag 23k. The one-way valve 27 is a valve that allows the flow of the gas only in a direction from any of the bags 23c, 23e, and 23g to the upright bag 23k.

Next, the collision detection device 30 will be described. As illustrated in FIG. 1, the collision detection device 30 includes a camera 31 as a detection device facing forward through a front windshield W, and the control unit 32 as the controller disposed at an appropriate place inside the engine room or the like.

This camera 31 is an infrared camera. Nonetheless, the camera 31 may instead be a publicly known camera designed for ordinary shooting. The camera 31 shoots an image in front of the vehicle body through the enginehood 1 and thus detects a situation in front of the vehicle body. Alternatively, the camera 31 may adopt a camera to be used for an advanced driver assistance system to assist a driver in a driving operation. The advanced driver assistance system is a system developed in order to automate, adapt, and strengthen a vehicle system for safer and better driving.

The control unit 32 has shot image data input from the camera 31 and predicts whether or not there is a pedestrian who is liable to approach and collide with the front end portion of the enginehood 1 of the automobile V in motion. In this case, the control unit 32 predicts whether or not there is the pedestrian liable to approach and collide with the front end portion of the enginehood 1 by calculating a change in size (area) of the pedestrian at remote and close positions in front of the enginehood 1 for each predetermined time period, for example.

When the control unit 32 predicts that there is the pedestrian liable to collide with the front end portion of the enginehood 1, the control unit 32 calculates as to what position in the right-left direction of the front end portion of the enginehood 1 the pedestrian is likely to collide, thereby predicting a colliding position. In addition, the control unit 32 sends a drive signal to the electric motor of the lift-up mechanism in the pop-up hood unit 10, thus driving the electric motor. Accordingly, the support rods 11 are lifted by the drive of the electric motor whereby the pop-up hood unit 10 is lifted above the front end portion of the enginehood 1 and fixed at that position.

Next, the control unit 32 detects that the pop-up hood unit 10 is lifted, or in other words, that the opening 5 for deploying the bag unit 22 is open above the airbag system 20. Then, the control unit 32 transmits an ignition signal to the inflator unit 21. In this case, the control unit 32 transmits the ignition signal to the component inflator in the inflator unit 21 that corresponds to the predicted colliding position. For example, if the predicted colliding position is located at the central part of the enginehood 1, the control unit 32 first transmits the ignition signal to the central inflator 21a corresponding thereto and then transmits more ignition signals to the left inflator 21b and the right inflator 21c. Meanwhile, if the predicted colliding position is located on the left side of the enginehood 1, the control unit 32 first transmits the ignition signal to the left inflator 21b corresponding thereto and then transmits more ignition signals to the central inflator 21a and the right inflator 21c. In the meantime, if the predicted colliding position is located on the right side of the enginehood 1, the control unit 32 first transmits the ignition signal to the right inflator 21c corresponding thereto and then transmits more ignition signals to the central inflator 21a and the left inflator 21b.

Here, when the predicted colliding position is located on the left side of the enginehood 1, the ignition signals may be transmitted to the left inflator 21b and the central inflator 21a in advance and then the ignition signal may be transmitted to the right inflator 21c later. Likewise, when the predicted colliding position is located on the right side of the enginehood 1, the ignition signals may be transmitted to the right inflator 21c and the central inflator 21a in advance and then the ignition signal may be transmitted to the left inflator 21b later.

Meanwhile, when the predicted colliding position is located at the central part of the enginehood 1, the ignition signals may be transmitted to the central inflator 21a, the left inflator 21b, and the right inflator 21c at the same time.

Here, a sensor to detect a collision may be provided to a bumper at the front end of the vehicle body and the like, and the control unit 32 may detect an actual colliding position by using a signal from the sensor.

Next, a description will be given of an operation in case of a collision of the pedestrian H with the front end portion of the vehicle body.

First of all, when the automobile V is made drivable by turning on the ignition and the like, the camera 31 of the collision detection device 30 starts shooting the front of the vehicle body and the image data shot of the camera 31 is input into the control unit 32. Based on the inputted shot image data, the control unit 32 starts the prediction as to whether or not there is the pedestrian H liable to collide with the front end portion of the enginehood 1.

When the control unit 32 predicts that there is the pedestrian H liable to collide with the front end portion of the enginehood 1, the control unit 32 further predicts what position in the right-left direction of the enginehood 1 the pedestrian H is likely to collide. At the same time, the drive signal is sent from the control unit 32 to the lift-up mechanism in the pop-up hood unit 10, and the pop-up hood unit 10 is lifted. In other words, the pop-up hood unit 10 is lifted before the collision by using the collision detection device 30.

Then, as the opening 5 is defined by lifting the pop-up hood unit 10, the bag unit 22 of the airbag system 20 is deployed on the enginehood 1 through the opening 5. In this case, the control unit 32 sends the ignition signal to one of the three inflators 21a to 21c located close to the colliding position of the pedestrian H predicted by the control unit 32. When the control unit 32 predicts that the colliding position of the pedestrian H is located at the central part of the enginehood 1, for example, the ignition signal is transmitted to the central inflator 21a so as to deploy the bag 23a at the central part of the front end to begin with. Meanwhile, when the control unit 32 predicts that the colliding position of the pedestrian H is located on the left side of the enginehood 1, for example, the ignition signal is transmitted to the left inflator 21b so as to deploy the bag 23b on the left side of the front end to begin with. In the meantime, when the control unit 32 predicts that the colliding position of the pedestrian H is located on the right side of the enginehood 1, the ignition signal is transmitted to the right inflator 21c so as to deploy the bag 23c on the right side of the front end to begin with. In the following, the case of predicting the central part of the enginehood 1 as the colliding position of the pedestrian H will be described as an example.

Figure 4:
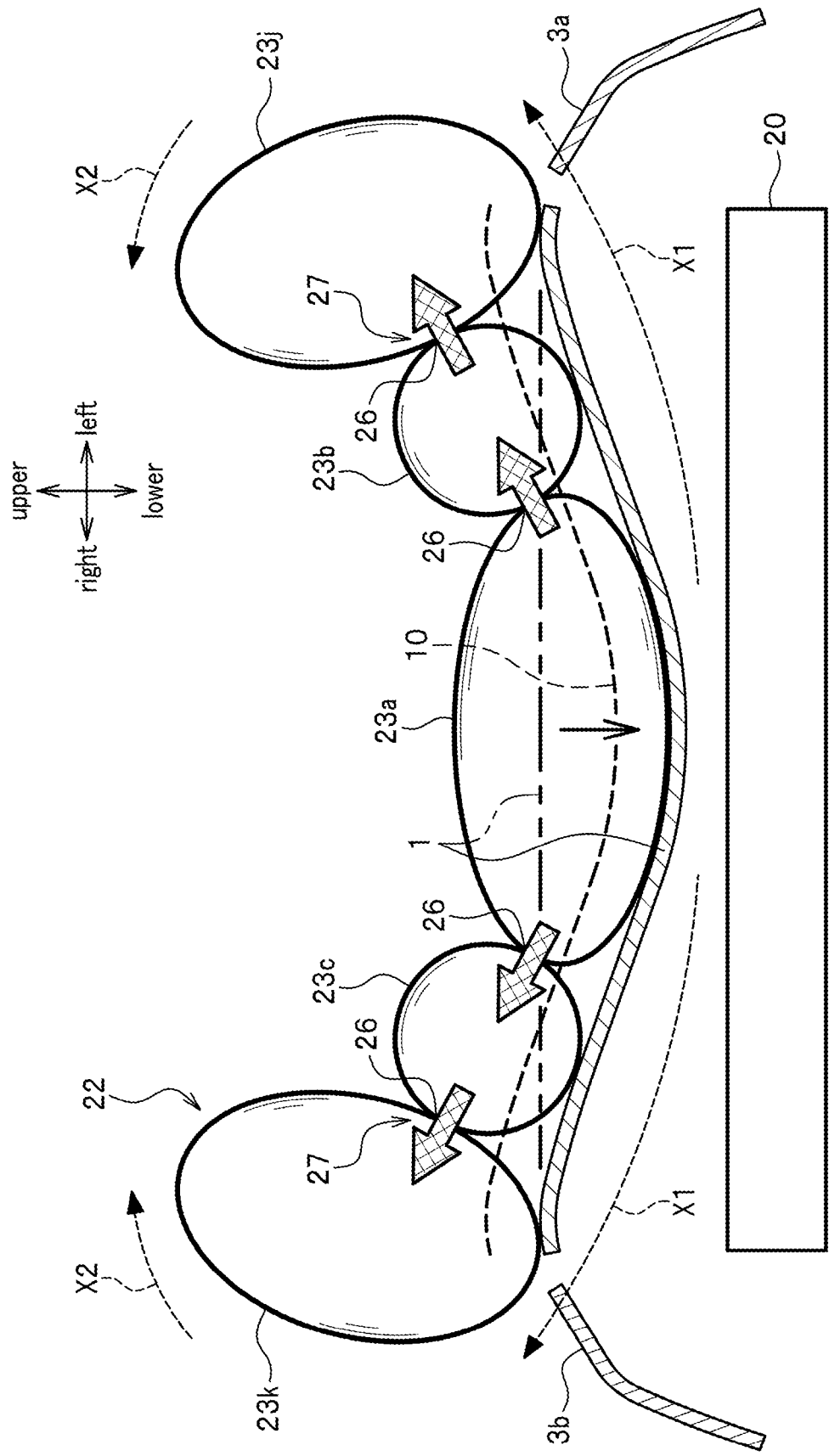
FIG. 4 is a partially sectional schematic front view which illustrates a hop-up hood unit and a bag unit of an airbag system in case of a collision with a target for protection such as a pedestrian.

If the pedestrian H collides with the front end portion of the vehicle body after the prediction of the colliding position by the control unit 32, the pedestrian H hits the lifted pop-up hood unit 10 and the pop-up hood unit 10 is deformed as a consequence (see FIG. 4 in which the pedestrian H is not illustrated). In other words, the pop-up hood unit 10 can receive the colliding pedestrian H, thus appropriately absorbing an impact on the pedestrian H by the deformation of the pop-up hood unit 10. In this case, the pop-up hood unit 10 is lifted from the front end portion of the enginehood 1 of the vehicle body, and therefore receives the waist of the pedestrian H which is close to the center of the gravity. In this way, the pop-up hood unit 10 effectively absorbs the impact at the time of the collision of the pedestrian H.

Figure 5:
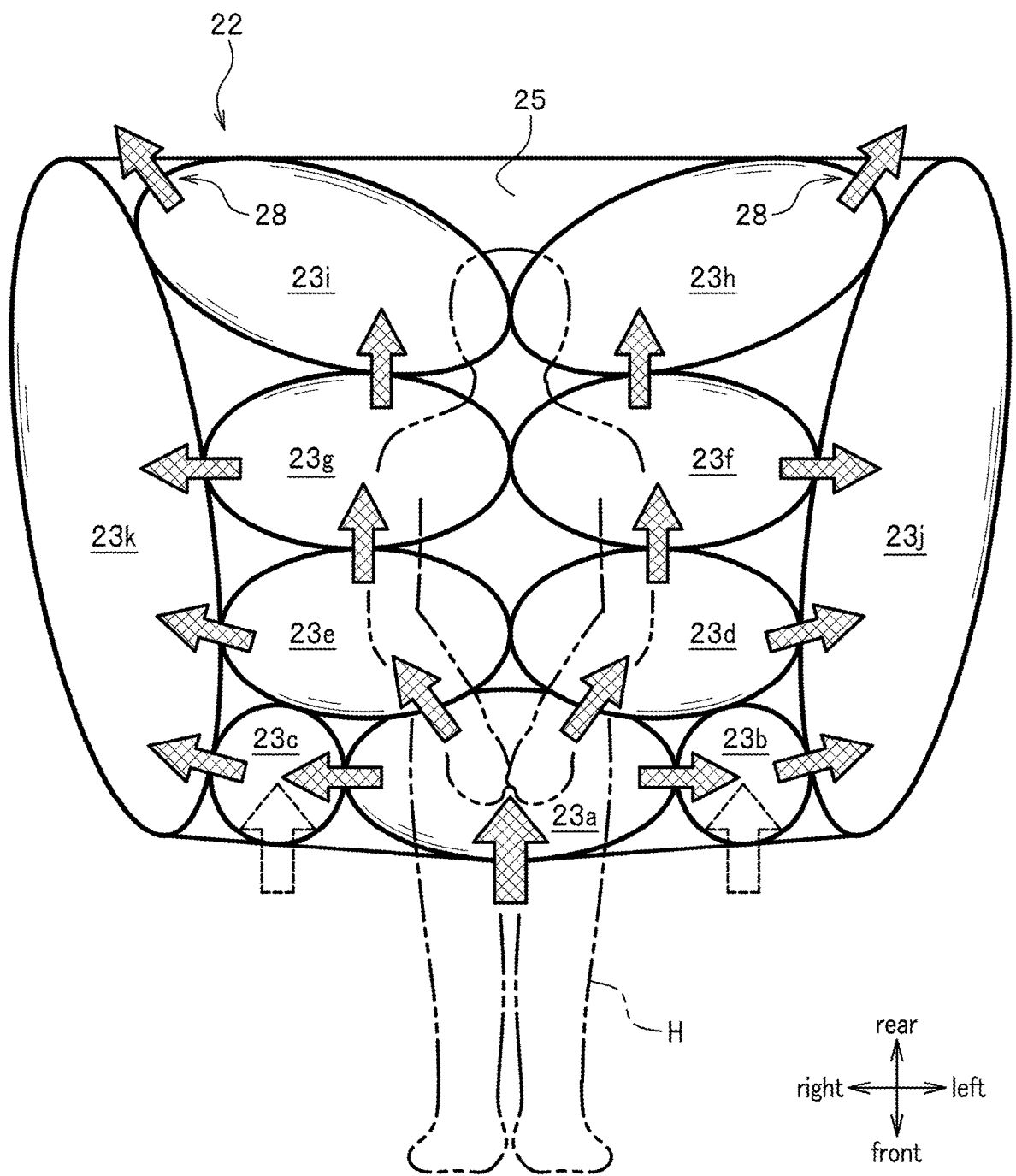
FIG. 5 is a schematic plane view illustrating a flow of gas in the bag unit of the airbag system.

Thereafter, the pedestrian H relieved from the impact by the pop-up hood unit 10 moves onto the bag unit 22 deployed continuously behind the pop-up hood unit 10 (see FIG. 5). In this case, the pedestrian H moves onto the bag 23a that is deployed from the pop-up hood unit 10 to the central part of the front end of the bag unit 22, and then onto the rear bags 23d to 23i while allowing the bag 23a to absorb the impact. When the bag 23a located at the central part of the front end is squashed by a load of the pedestrian H in the process of this movement, the gas inside the bag 23a is pushed out (escapes) through the communication paths 26 to the adjacent bags 23b and 23c in the smaller-diameter spherical shape located on the left and right sides, and is also pushed out (escapes) to the adjacent bags 23d and 23e in the spheroidal shape located at the rear and diagonally left and right of the bag 23a.

Moreover, when the bag 23a located at the central part of the front end is squashed by the load of the pedestrian H, the gas continuously ejected from the central inflator 21a flows from the bag 23a through the communication paths 26 to the adjacent bags 23b and 23c located at the left and right of the bag 23a and to the adjacent bags 23d and 23e located at the rear and diagonally left and right of the bag 23a. Accordingly, internal pressures of the bags 23b to 23e adjacent to the bag 23a are increased in advance. Thus, the impact is appropriately absorbed in response to the movement of the load of the pedestrian H. Here, each of the adjacent bags 23b and 23c on the left and right sides has a smaller volume than those of the remaining bags 23d and the like. Accordingly, the internal pressures of the bags 23b and 23c are rapidly increased. In this way, the impact is appropriately absorbed when the pedestrian H moves to the left or right from the bag 23a at the central part of the front end.

Then, the ignition signals are sent from the control unit 32 to the left and right inflators 21b and 21c. Thus, the gas is ejected from the left and right inflators 21b and 21c to the left and right bags 23b and 23c of the front end. The ignition signals may be transmitted from the control unit 32 to the left and right inflators 21b and 21c at a timing before the bag 23a at the center begins to be squashed by the load of the pedestrian H. Otherwise, the ignition signals may be transmitted by predicting a timing when the bag 23a begins to be squashed, or by predicting a timing after the bag 23a is squashed to some extent.

The gas ejected into the left and right bags 23b and 23c of the front end flows to the left and right upright bags 23j and 23k through the sideways communication paths 26. In this instance, if the load of the pedestrian H moves to the bag 23c on the right side out of the adjacent bags 23b and 23c on the left and right sides, for example, the bag 23c is squashed by the load of the pedestrian H and the gas inside the bag 23c flows to the upright bag 23k on the right side in such a manner as to be pushed out by the load of the pedestrian H. Moreover, even after the bag 23c on the right side is squashed by the load of the pedestrian H, the gas continuously ejected from the right inflator 21c flows from the bag 23c through the communication path 26 to the upright bag 23k on the right side whereby the upright bag 23k on the right side is continuously inflated. Meanwhile, the gas ejected to the bag 23b on the left of the front end flows through the communication path 26 into the upright bag 23j on the left side. Accordingly, the upright bag 23j on the left side is inflated.

In the meantime, the gas flowing from the bag 23a at the central part of the front end to the bags 23d and 23e located at the rear and diagonally left and right of the bag 23a further flows to the rear bags 23f and 23g and to the further rear bags 23h and 23i through the corresponding communication paths 26. Meanwhile, part of the gas flowing into the bag 23d located at the diagonally left and rear of the bag 23a and to the rear bag 23f flows to the upright bag 23j on the left side through the corresponding communication paths 26. In the meantime, part of the gas flowing into the bag 23e located at the diagonally right and rear of the bag 23a and to the rear bag 23g flows to the upright bag 23k on the right side through the corresponding communication paths 26. Thus, the left and right upright bags 23j and 23k are inflated.

In this case, when the load of the pedestrian H moves to the bags 23d and 23e located at the diagonally right and left and rear of the bag 23a, for example, the bags 23d and 23e are squashed by the load of the pedestrian H whereby the gas inside the bags 23d and 23e is pushed out by the load of the pedestrian H and flows into the rear bags 23f and 23g and to the left and right upright bags 23j and 23k. Thus, the rear bags 23f and 23g and the left and right upright bags 23j and 23k are quickly inflated. Likewise, when the load of the pedestrian H moves to the rear bags 23f and 23g, the bags 23f and 23g are squashed by the load of the pedestrian H whereby the gas inside the bags 23f and 23g is pushed out by the load of the pedestrian H and flows into the further rear bags 23h and 23i and to the left and right upright bags 23j and 23k. Thus, the rear bags 23h and 23i are quickly inflated and the left and right upright bags 23j and 23k are quickly inflated at the same time. As the rear bags 23h and 23i are inflated, the pedestrian H is inhibited from jumping into the front windshield W. The gas flowing into the rear bags 23h and 23i is then discharged from the discharge valves 28.

Note that the gas can communicate between the left and right bags 23d and 23e, between the left and right bags 23f and 23g, and between the left and right bags 23h and 23i, through the corresponding communication paths 26, respectively.

When the pedestrian H moves onto the bag unit 22, the enginehood 1 is deformed into a concave shape as illustrated in FIG. 4 due to a reactive force of the bag unit 22 receiving the load of the pedestrian H. As the enginehood 1 is deformed into the concave shape as described above, the bag unit 22 is also deformed into a concave shape in conformity to the shape of the enginehood 1. Accordingly, a force in directions indicated with arrows X1 in FIG. 4 acts on a bottom surface side of the bag unit 22, and the left and right upright bags 23j and 23k are tilted in directions indicated with arrows X2 in FIG. 4 in such a way as to wrap around the pedestrian H who moves onto the bag unit 22 from both of the left and right sides. In this way, even when the pedestrian H moves to the right or left on the bag unit 22 after the collision, the left and right upright bags 23j and 23k serves as walls that avoid a second collision of the pedestrian H to fall down to the ground from the right or left of the enginehood 1. Thus, the pedestrian H is appropriately protected.

According to the above-described vehicle body front structure of this embodiment, the pop-up hood unit 10 at the front end portion of the vehicle body is lifted above the enginehood 1 by using the lift-up mechanism at the time of the collision or at the time of prediction of the collision of the vehicle body of the automobile V with the pedestrian H. Thus, the pop-up hood unit 10 receives the pedestrian H colliding with the vehicle body and the impact on the pedestrian H is appropriately absorbed by the deformation of the pop-up hood unit 10. In this case, the pop-up hood unit 10 is lifted above from the front end portion of the vehicle body. Thus, the pop-up hood unit 10 receives the waist of the pedestrian H located near the position of the center of gravity of the pedestrian H colliding with the vehicle body, thereby effectively absorbing the impact on the pedestrian H.

Here, when the pop-up hood unit 10 hits the pedestrian H around the waist, the impact on the pedestrian H is appropriately absorbed whereby the pedestrian H gets pushed by the pop-up hood unit 10 and thus moves forward. Accordingly, relative velocities between the vehicle body and the pedestrian H come close to each other whereby the pedestrian H is less likely to be bounced back.

The pop-up hood unit 10 takes on the plate shape that extends in the right-left direction of the vehicle body. Accordingly, the pop-up hood unit 10 receives the pedestrian H and gets appropriately deformed in case of the collision with the pedestrian H, thus appropriately absorbing the impact on the pedestrian H.

As a consequence of lifting the pop-up hood unit 10, the opening 5 for deploying the bag unit 22 is defined at the same time. In other words, a gap formed by the lift of the pop-up hood unit 10 is used as the opening for deploying the bag unit 22.

In the meantime, the lift of the pop-up hood unit 10 is carried out in conjunction with the deployment of the bag unit 22. Thus, the impact on the pedestrian H is absorbed primarily by the pop-up hood unit 10 and then absorbed secondarily by the deployed bag unit 22. Accordingly, the impact on the pedestrian H is more effectively absorbed stepwise. In addition, reduction in manufacturing costs is achieved since it is not necessary to separately provide a port for deploying the bag unit 22.

The bag unit 22 is guided by the pop-up hood unit 10 and deployed continuously with the pop-up hood unit 10. Hence, the bag unit 22 is deployed smoothly and quickly on the enginehood 1. Moreover, the pop-up hood unit 10 and the bag unit 22 are continuous in the front-rear direction and are thus adapted to absorb the impact on the pedestrian H more effectively.

Since the collision detection device 30 is provided, the impact on the pedestrian H is predicted by using the camera 31 and the lift-up mechanism is activated with the signal from the control unit 32 before the collision so as to lift the pop-up hood unit 10 from the front end portion of the enginehood 1. In this way, the impact on the pedestrian H is absorbed more reliably.

Second Embodiment

Figure 6:
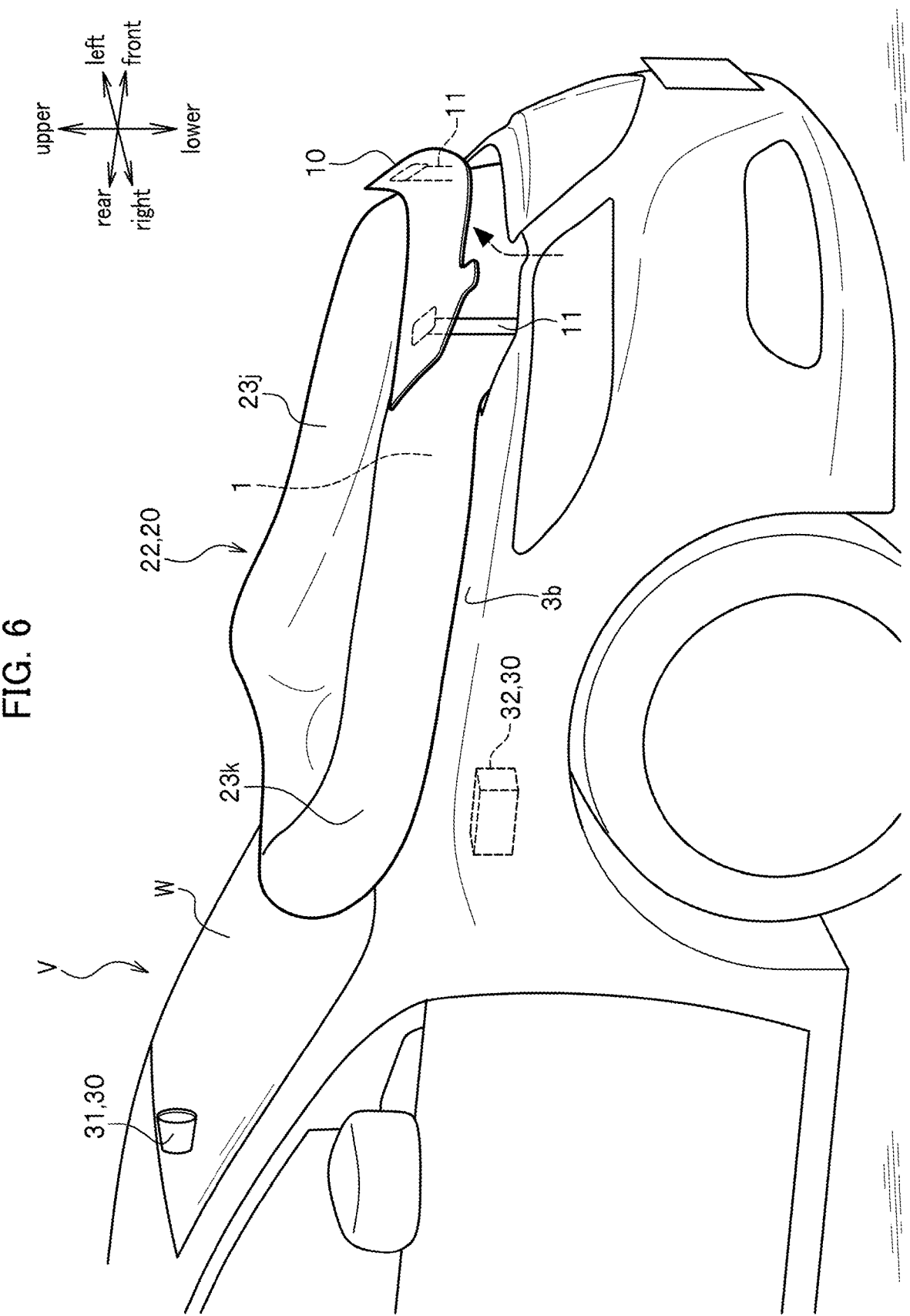
FIG. 6 is a perspective view of a vehicle body front portion which illustrates a lifted hop-up hood unit and a bag body of a deployed airbag system, in a vehicle body front structure according to a second embodiment of the present invention.

A vehicle body front structure of a second embodiment will be described with reference to FIG. 6. This embodiment is different from the first embodiment in that the pop-up hood unit 10 is provided such that an inclination angle of its plate surface is variable relative to a horizontal plane (not illustrated).

The pop-up hood unit 10 is lifted above the enginehood 1 by a predetermined amount through the lift-up mechanism that includes the not-illustrated driving source configured to drive the support rods 11. In this instance, the pop-up hood unit 10 is bent forward by using a not-illustrated link mechanism or the like. In other words, the plate surface of the pop-up hood unit 10 is turned forward in the process of being lifted and fixed. Here, the bag unit 22 is deployable through the defined opening 5.

According to this embodiment, the inclination angle of the plate surface of the pop-up hood unit 10 is variable. Hence, the plate surface is set to an inclination angle with which it is possible to effectively absorb the impact on the pedestrian H in accordance with the type of the vehicle, or in such a way that the plate surface faces the colliding pedestrian H, for example.

Here, the pop-up hood unit 10 may be configured to move (protrude) to the front of the vehicle body while being inclined in the process of being lifted and fixed. In this way, the colliding position on the pop-up hood unit 10 is shifted to the front of the vehicle body. Thus, it is possible to absorb the impact on the pedestrian H more effectively.

Third Embodiment

Figure 7:
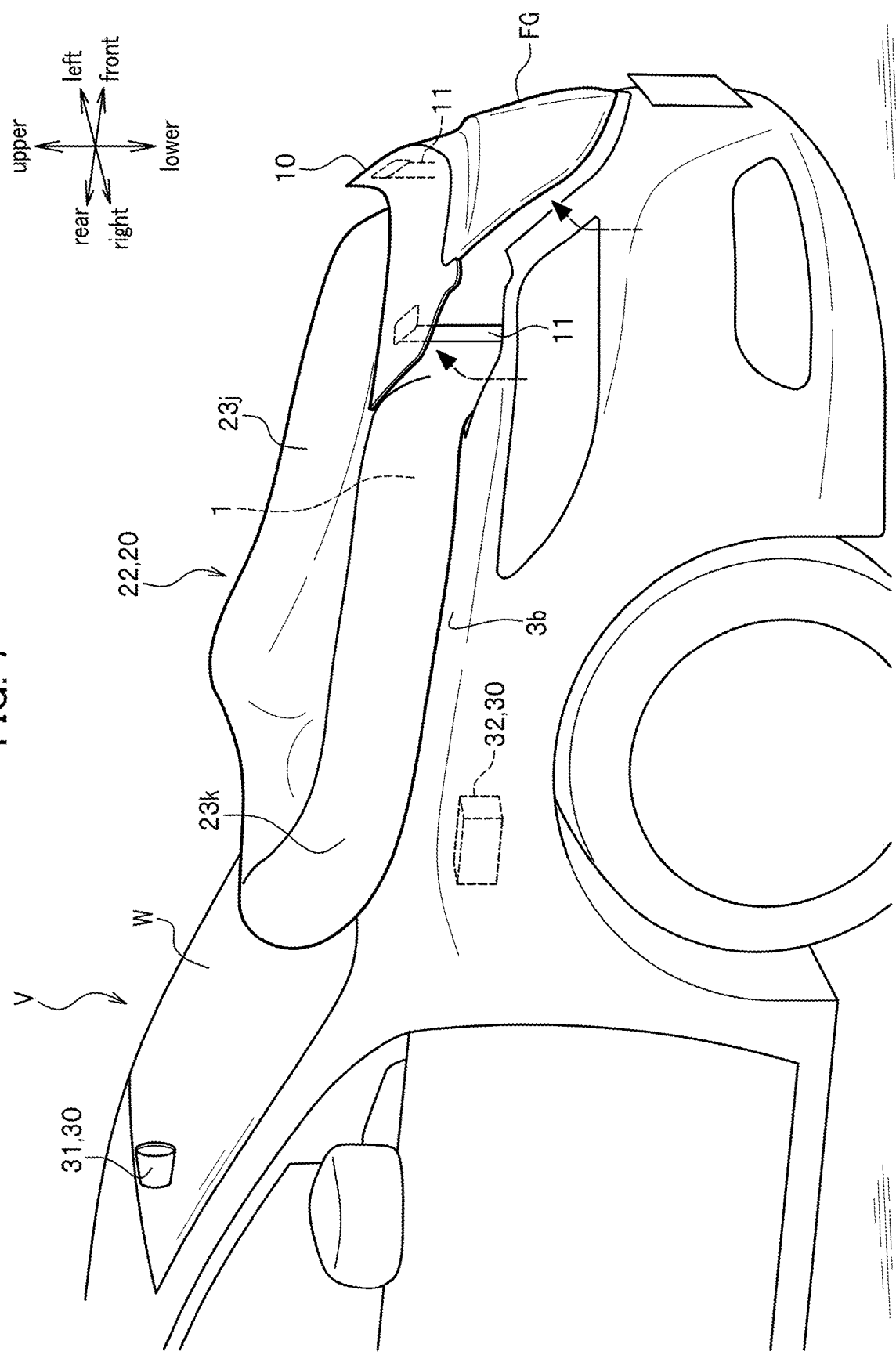
FIG. 7 is a perspective view of a vehicle body front portion, which illustrates a lifted hop-up hood unit and a deployed bag body of an airbag system, in a vehicle body front structure according to a third embodiment of the present invention.

A vehicle body front structure of a third embodiment will be described with reference to FIG. 7. This embodiment is different from the first and second embodiments in that the pop-up hood unit 10 is integrally provided with a front grill FG.

The pop-up hood unit 10 is provided continuously and integrally with an upper end portion of the front grill FG. The pop-up hood unit 10 is bent forward while being turned forward together with the front grill FG through the lift-up mechanism that includes the not-illustrated driving source configured to drive the support rods 11, and is thus lifted above the enginehood 1 by a predetermined amount. Then, the plate surface of the pop-up hood unit 10 is settled in the state of facing forward. Here, the bag unit 22 is deployable through the defined opening 5.

According to this embodiment, the pop-up hood unit 10 is turned and lifted integrally with the front grill FG. Hence, the plate surface faces the colliding pedestrian H and moves (projects) to the front of the vehicle body. In this way, the colliding position on the pop-up hood unit 10 is shifted to the front of the vehicle body, which makes it possible to absorb the impact on the pedestrian H more effectively.

Fourth Embodiment

Figure 8:
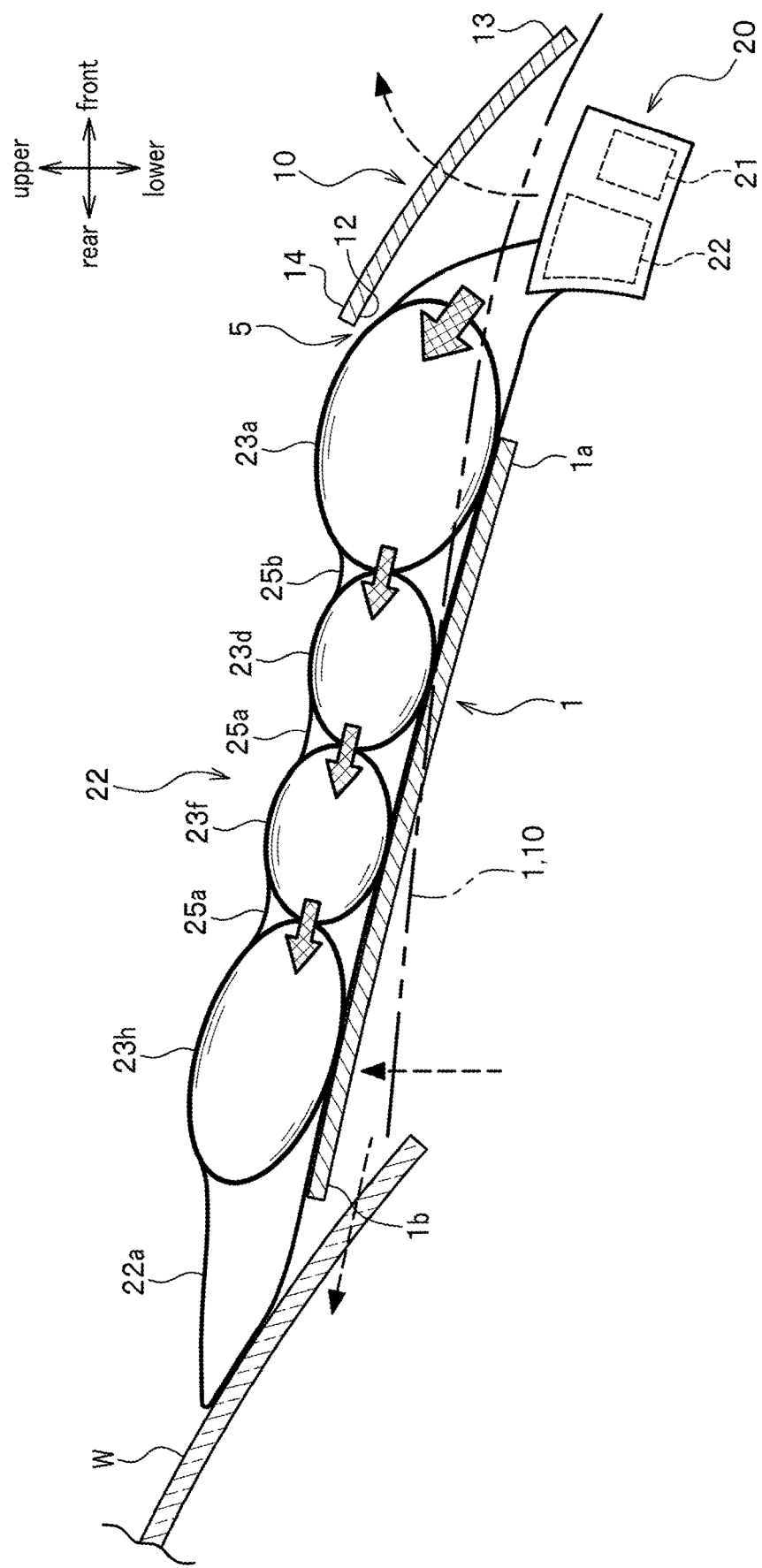
FIG. 8 is a perspective view of a vehicle body front portion, which illustrates a lifted hop-up hood unit and a bag body of a deployed airbag system, in a vehicle body front structure according to a fourth embodiment of the present invention.

A vehicle body front structure of a fourth embodiment will be described with reference to FIG. 8. This embodiment is different in that the opening 5 is defined by allowing the enginehood 1 to move as well.

A front part side of the enginehood 1 is lowered and a rear part side thereof is lifted by a not-illustrated hood movement mechanism. Moreover, the entire enginehood 1 moves rearward whereby the rear part side overlaps the lower part of the front windshield W.

The rear part 14 of the pop-up hood unit 10 is mainly lifted by using its front part as a fulcrum. The opening 5 is defined between the enginehood 1 and the pop-up hood unit 10 as a consequence of the movement of the enginehood 1 and the movement of the pop-up hood unit 10 described above. In this case as well, the bag unit 22 is guided by the lower rear edge part 12 of the pop-up hood unit 10 and the portion in the vicinity thereof and is deployed continuously behind the pop-up hood unit 10.

Here, a rear end portion of the bag unit 22 includes an extending part 22a that covers part of the front windshield W. The extending part 22a has a bag shape which is inflated by the gas sent from the inflator unit 21.

According to this embodiment, the relative movements of the pop-up hood unit 10 and the enginehood 1 define the opening 5, thus deploying the bag unit 22 more quickly. In the meantime, the front part side of the enginehood 1 is lowered while the rear part side thereof is lifted so as to be bent forward, whereby the bag unit 22 deployed on the enginehood 1 is also bent forward. As a consequence, the pedestrian H is less likely to move rearward and the pedestrian H is appropriately protected on the bag unit 22.

Fifth Embodiment

A vehicle body front structure of a fifth embodiment will be described with reference to FIG. 9. This embodiment is different from the first to fourth embodiments in that the left and right upright bags 23*j* and 23*k* are provided with contact parts 23*j*1 and 23*k*1, respectively.

The contact parts 23*j*1 and 23*k*1 are integrally provided to lower parts of the left and right upright bags 23*j* and 23*k*. The contact parts 23*j*1 and 23*k*1 are capable of coming into contact with the left and right fenders 3*a* and 3*b*, and extend downward so as to cover at least part of the left and right fenders 3*a* and 3*b*.

The above-described contact parts 23*j*1 and 23*k*1 come into contact with the left and right fenders 3*a* and 3*b*, respectively, as a consequence of inflation of the left and right upright bags 23*j* and 23*k* with the gas. As the contact parts 23*j*1 and 23*k*1 come into contact with the left and right fenders 3*a* and 3*b*, the left and right upright bags 23*j* and 23*k* fall onto the pedestrian H due to reactive forces thereof in directions indicated with arrows X2 in FIG. 9 in such a way as to wrap around the pedestrian H who moves onto the bag unit 22 from both of the left and right sides.

According to this embodiment, even when the pedestrian H moves to the right or left on the bag unit 22 after the collision, the left and right upright bags 23*j* and 23*k* serves as the walls that more reliably avoid the second collision of the pedestrian H to fall down to the ground from the right or left of the enginehood 1. Thus, the pedestrian H is appropriately protected.

Sixth Embodiment

A vehicle body front structure of a sixth embodiment will be described with reference to FIG. 10. This embodiment is a modified example of the above-described fifth embodiment.

The upright bag 23*j* on the left side includes an inner bag 23*j*2, an outer bag 23*j*3, a lower tether (link) member 23*j*4, and an upper tether member 23*j*5. Meanwhile, the upright bag 23*k* on the right side includes an inner bag 23*k*2, an outer bag 23*k*3, a lower tether member 23*k*4, and an upper tether member 23*k*5. Since the upright bag 23*j* on the left side and the upright bag 23*k* on the right side are symmetric to each other, the upright bag 23*j* on the left side will be described below in detail while the upright bag 23*k* on the right side will be explained as needed.

In the upright bag 23*j* on the left side, each of the inner bag 23*j*2 and the outer bag 23*j*3 extends in the front-rear direction on the fender 3*a* on the left side, and has an oval cross-sectional shape. The gas flows from the bag 23*b* of the front end and from the bags 23*d* and 23*f* (see FIG. 3) into the inner bag 23*j*2 on the left side through the corresponding communication paths 26. Incidentally, the gas flows from the bag 23*c* and from the bags 23*e* and 23*g* (see FIG. 3) on the front right side into the inner bag 23*k*2 on the right side through the corresponding communication paths 26.

In the upright bag 23*j* on the left side, the inner bag 23*j*2 is connected to the outer bag 23*j*3 through a communication path 26*a* and the gas flows from the inner bag 23*j*2 into the outer bag 23*j*3 through the communication path 26*a*.

The lower part of the outer bag 23*j*3 extends below the inner bag 23*j*2 and is located on the side face of the fender 3*a* on the left side. Meanwhile, a lower part of the outer bag 23*k*3 is located on the side face of the fender 3*b* on the right side.

The lower tether member 23*j*4 connects the lower end portions of the inner bag 23*j*2 and of the outer bag 23*j*3 to each other. The lower tether member 23*j*4 extends to cover at least part of the fender 3*a* on the left side. Incidentally, in the upright bag 23*k* on the right side, the lower tether member 23*k*4 extends to cover at least part of the fender 3*b* on the right side. The lower tether member 23*j*4 and the lower tether member 23*k*4 constitute the contact parts to come into contact with the left and right fenders 3*a* and 3*b*.

The upper tether member 23*j*5 connects the upper end portions of the inner bag 23*j*2 and of the outer bag 23*j*3 to each other. Incidentally, in the upright bag 23*k* on the right side, the upper tether member 23*k*5 connects the upper end portions of the inner bag 23*k*2 and of the outer bag 23*k*3 to each other.

When the gas flows in and inflates the upright bag 23*j* on the left side, the lower end portion of the outer bag 23*j*3 comes into contact with the fender 3*a* on the left side through the lower tether member 23*j*4. Meanwhile, when the gas flows in and inflates the upright bag 23*k* on the right side, the lower end portion of the outer bag 23*k*3 comes into contact with the fender 3*b* on the right side through the lower tether member 23*k*4. When the above-described contact takes place, the left and right upright bags 23*j* and 23*k* fall onto the pedestrian H due to reactive forces thereof in directions indicated with arrows X2 in FIG. 10 in such a way as to wrap around the pedestrian H who moves onto the bag unit 22 from both of the left and right sides.

According to this embodiment, even when the pedestrian H moves to the right or left on the bag unit 22 after the collision, the left and right upright bags 23*j* and 23*k* serves as the walls that more reliably avoid the second collision of the pedestrian H to fall down to the ground from the right or left of the enginehood 1. Thus, the pedestrian H is appropriately protected.

The vehicle body side structures according to the embodiments have been described above in detail with reference to the drawings. It is to be noted, however, that the present invention shall not be limited only to these embodiments and various changes are possible as appropriate within the range not departing from the scope of the present invention.

For example, the bag unit 22 does not always have to be of the symmetric structure. In the meantime, a quantity and sizes of the bags may also be set as desired which may be different between the left side and the right side.

A quantity of the component inflators in the inflator unit 21 is not limited to three. In this context, two or less, or four or more inflators may be installed instead. In the meantime, when two or more component inflators are provided in the inflator unit 21, amounts of ejection of gas may vary among the component inflators.

The one-way valves 27 may be provided to the communication paths 26 as appropriate. In this way, an impact attributable to the movement of the load of the pedestrian H is appropriately absorbed by the adjacent bags (such as bags 23*b*, 23*c*, and the like).

Each of the left and right upright bags 23*j* and 23*k* may be provided with a gas discharge valve that discharges the gas to the outside while retaining a predetermined internal pressure.

The camera 31 is used as the detection device. Without limitation to the foregoing, the pedestrian H may be detected by using a radar device instead.

The present invention is applicable to a wide range of vehicles each provided with an energy storage, examples of which include a hybrid vehicle, an electric vehicle, a fuel-cell vehicle, and the like.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A vehicle body front structure comprising:
a pop-up hood unit disposed on a front end portion of an enginehood of a vehicle body and configured to translate upward above the enginehood by using a lift-up mechanism,
wherein the pop-up hood unit is deformable due to an input of an impact upon a collision with a target for protection,
wherein the pop-up hood unit is shaped as a plate that extends in a left-right direction of the vehicle body, and
wherein the pop-up hood unit has a plate surface having an inclination angle that is variable relative to a horizontal plane.

2. The vehicle body front structure according to claim 1, further comprising:
a bag unit configured to deploy on the enginehood of the vehicle body by a gas from an inflator,
wherein the bag unit deploys on the enginehood through an opening that is formed at the front end portion of the vehicle body with the pop-up hood unit moved upward.

3. The vehicle body front structure according to claim 2, wherein the bag unit is configured to deploy in contact with the pop-up hood unit while being guided by the pop-up hood unit.

4. The vehicle body front structure according to claim 1, further comprising:
a detection device configured to detect a situation in front of the vehicle body; and
a control unit configured to operate the lift-up mechanism by predicting a collision with the target for protection based on a detection of the detection device.

5. The vehicle body front structure according to claim 1, wherein the pop-up hood unit is configured to translate upward above the enginehood by moving in a substantially linear upward direction by using the lift-up mechanism.

6. The vehicle body front structure according to claim 1, wherein the lift-up mechanism comprises support rods that engage the pop-up hood unit and are configured to be driven in a substantially linear upward direction so as to translate the pop-up hood unit in the substantially linear upward direction to dispose the pop-up hood unit upward above the enginehood.

* * * * *